United States Patent

[11] 3,631,277

[72] Inventors Russell G. Ferdig
Ypsilanti;
Robert W. Burby, Dexter, both of Mich.
[21] Appl. No. 98,252
[22] Filed Dec. 15, 1970
[45] Patented Dec. 28, 1971
[73] Assignee Ford Motor Company
Dearborn, Mich.

[54] STATOR FOR A PERMANENT MAGNET DYNAMOELECTRIC MACHINE INCLUDING NOVEL MAGNET RETAINING MEANS
5 Claims, 7 Drawing Figs.

[52] U.S. Cl. .................................................. 310/154, 310/42
[51] Int. Cl. .................................................. H02k 21/26
[50] Field of Search ........................................... 310/154, 42, 103, 153, 155; 29/576

[56] References Cited
UNITED STATES PATENTS
3,091,713 5/1963 Latta ............................. 310/154
3,213,303 10/1965 Riley et al. ..................... 310/50

*Primary Examiner*—D. X. Sliney
*Attorneys*—John R. Faulkner and Keith L. Zerschling ABSTRACT: A stator for a permanent magnet dynamoelectric machine in which prestressed magnet retaining means are employed to hold permanent magnets in engagement with the inner surface of a cylindrical ferromagnetic frame. The stresses developed in these magnet retaining means also retain or hold these magnet retaining means within the cylindrical ferromagnetic frame.

There is also disclosed a method for installing the magnet retaining means and the permanent magnets within the cylindrical ferromagnetic frame including positioning a pair of magnet retaining means at opposed positions within the cylindrical ferromagnetic frame, applying a radially outward force on the body portion of the magnet retaining means to rotate permanent magnet engaging tabs toward each other, inserting axially a pair of arcuate permanent magnets within the cylindrical frame, and removing the radially outward force on the body portion of the magnet retaining means so that the tabs rotate outwardly into an engagement with the edges of the arcuate permanent magnets.

PATENTED DEC 28 1971 3,631,277

INVENTORS
ROBERT W BURBY
RUSSELL G. FERDIG
BY John R. Faulkner
Keith L. Zerschling
ATTORNEYS

INVENTORS
ROBERT W. BURBY
RUSSELL G. FERDIG
BY
ATTORNEYS

STATOR FOR A PERMANENT MAGNET DYNAMOELECTRIC MACHINE INCLUDING NOVEL MAGNET RETAINING MEANS

BACKGROUND OF THE INVENTION

This invention relates to a dynamoelectric machine having permanent magnets which supply the operative magnetic field for the machine, and more particularly to such a dynamoelectric machine including novel retaining means for retaining the permanent magnets within the frame of the machine. The invention also relates to a method for installing the magnet retaining means and the permanent magnets within the frame or stator of the dynamoelectric machine.

In small fractional horsepower dynamoelectric machines such as those used in automotive vehicles to power windshield wipers, heater blower motors and power windows, ceramic permanent magnets positioned against a cylindrical ferromagnetic frame are currently used to provide the operative field for the dynamoelectric machine. These permanent magnets are generally arcuate in configuration with an outer surface conforming to the inner surface of the cylinder frame.

Various means have been employed to secure these arcuate permanent magnets within the cylindrical frame of the machine. These means include bonding the outer surface of the arcuate permanent magnets to the inner surface of the cylindrical frame by suitable adhesives. These means also include the use of spring clips positioned between spaced ends of the arcuate permanent magnets for forcing these permanent magnets against the inner surface of the cylindrical frame and for preventing axial movement of the permanent magnets within the frame. In these systems the clips and permanent magnets are mounted on a fixture and the cylindrical yoke or frame is then positioned around the assembly of the clips and the permanent magnets. A rivet is then positioned through the body portion of each clip and the cylindrical frame to hold these clips in position on the frame and in engagement with the permanent magnets. In addition, these clips have tabs or ears extending over the ends of the permanent magnets to prevent movement of these magnets in an axial direction with respect to the cylindrical frame or yoke.

SUMMARY OF THE INVENTION

The present invention provides a novel magnet retaining or spring clip means for retaining arcuate permanent magnets in a cylindrical ferromagnetic frame of a dynamoelectric machine. It also provides a novel method for installing these spring clips and arcuate permanent magnets within a cylindrical ferromagnetic frame of a dynamoelectric machine.

In the invention a pair of spring clips including a body portion and a pair of tabs extending on opposite sides of the body portion at an angle to it are positioned in opposed relationship against the inner surface of a cylindrical ferromagnetic frame. A radical force is then applied to the main body portion, which may form a chord across a given segment of the frame, to deform the main body portion radially outwardly and rotate the tabs toward each other. A pair of arcuate shape permanent magnets, which may be of the ceramic type, are then inserted between the spring clips axially with respect to the cylindrical ferromagnetic frame.

The arcuate permanent magnets have an arcuate length such that the space between the edge of one magnet and the edge of the other magnet in the area of the clip is greater than the space between the tabs subsequent to the application of this radial force, but is less than the space between the tabs prior to the application of this radial force. The radial force is then removed from the body portion of each of the clips so that the tabs rotate outwardly from each other into engagement with the edges of the permanent magnets, thereby internally stressing the materials of the spring clips and applying a force on the permanent magnet.

The resultant force applied by the spring clips against the edges of the arcuate shaped permanent magnets is sufficient not only to hold these permanent magnets against the inner surface of the cylindrical frame, but is also sufficient to retain the spring clips permanently in position within the cylindrical frame or yoke. Additionally, the forces applied by the spring clips are sufficient to prevent axial movement of both the permanent magnets and the spring clips with respect to this cylindrical frame or yoke.

Thus, the structure and method of the present invention eliminate any need for affixing the spring clips or magnet retaining means to the cylindrical frame or yoke such as the riveting procedure discussed above. In addition, there is no need to provide tabs or ears on the spring clips or magnet retaining means to prevent axial movement of the permanent magnets with respect to the cylindrical frame or yoke.

An object of the present invention is to provision of a novel magnet retaining means for a dynamoelectric machine.

A further object of the invention is the provision of a novel method for assembling a cylindrical ferromagnetic frame, permanent magnets and magnet retaining means to form a stator for a permanent magnet dynamoelectric machine.

Another object of the invention is the provision of a stator for a permanent magnet dynamoelectric machine in which uncomplicated and inexpensive magnet retaining means are employed for maintaining the permanent magnets within a cylindrical frame or yoke.

Still another object of the invention is the provision of a stator for a dynamoelectric machine in which magnet retaining means are installed within the stator in a way to secure both the permanent magnets employed with the machine and these magnet retaining means within a cylindrical frame or yoke that forms a portion of the stator.

Other objects and attendant advantages of the present invention may be realized when the specification is considered in connection with the attached drawings.

DESCRIPTION OF THE PREFERRED EMBODIMENT

Figure 1:
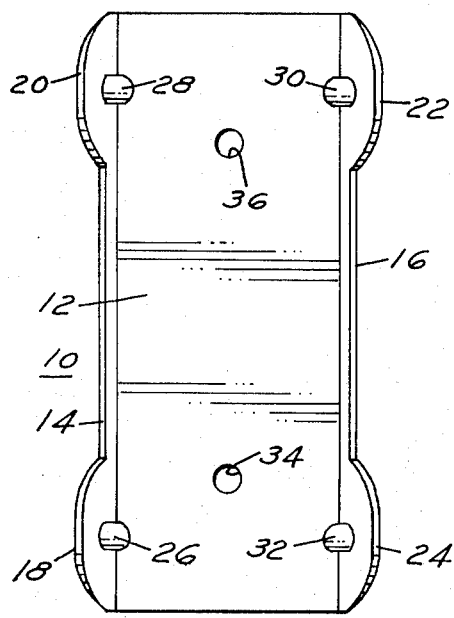
FIG. 1 is a bottom plan view of the magnet retaining means of the present invention.
Figure 2:
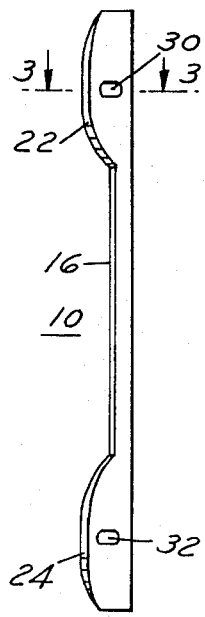
FIG. 2 is a side elevational view of the magnet retaining means of the present invention.
Figure 3:
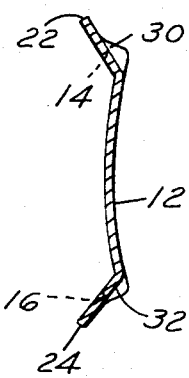
FIG. 3 is an end elevational view of the magnet retaining means of the present invention.

Referring now to the drawings in which like reference numerals designate like parts throughout the several views thereof, there is shown in FIGS. 1, 2 and 3 the magnet retaining means or spring clip 10 of the present invention which is preferably constructed of spring steel stock. This spring clip or magnet retaining means 10 includes a generally rectangular body portion 12 having a pair of reinforcing or stiffening ribs 14 and 16 extending along the longer edges thereof. Four tabs or projections 18, 20, 22 and 24 extend outwardly from the reinforcing or stiffening ribs 14 and 16 and these tabs are located at each end of the longer sides of the body portion 12.

As specifically shown in FIG. 3, the reinforcing or stiffening ribs 14 and 16 extend at a substantial right angle to the body portion 12 and the body portion 12 is bowed inwardly slightly for purposes which will be described subsequently. In addition, the tabs or projections 18 through 24 extend from the reinforcing or stiffening ribs at an obtuse angle and outwardly from the center of the body portion 12. A plurality of stiffening or reinforcing struts 26, 28, 30 and 32 are struck inwardly into the reinforcing or stiffening ribs 14 and 16 and into the body portion 12 in the vicinity f each of the projections or tabs 18, 20, 22 and 24 to maintain the angle between the stiffening or reinforcing ribs 14 and 16, and hence the angle between the tabs or projections 18, 20, 22 and 24, and the edges of the body portion 12 substantially constant during the assembly operations to be described subsequently. The main body portion of the spring clip 10 has a pair of locating holes or apertures 34 and 36 positioned along the centerline thereof.

The magnet retaining means or spring clip 10 may be formed of SAE1065 spring steel and may have a thickness in the range of 0.018 to 0.021 inch.

Figure 5:
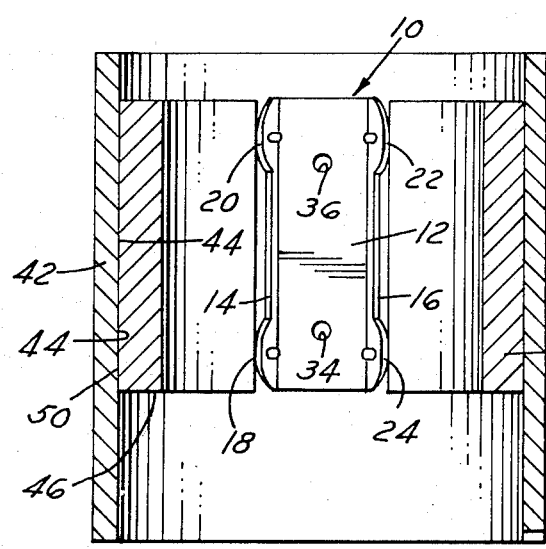
FIG. 5 is a sectional view taken along the lines 5—5 of FIG. 4.
Figure 4:
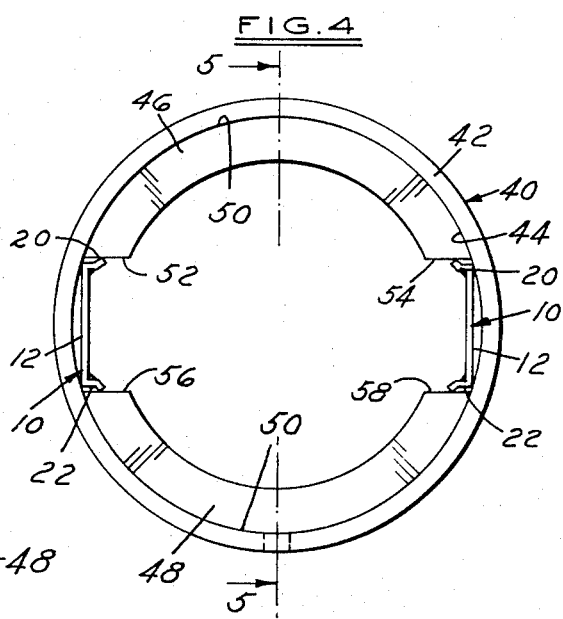
FIG. 4 is an end elevational view of a stator of a dynamoelectric machine employing the present invention.

FIGS. 4 and 5 disclose a stator 40 for a permanent magnet dynamoelectric machine utilizing the magnet retaining ans or spring clips 10 disclosed in FIGS. 1 through 3. This stator 40 comprises a cylindrical frame or yoke 42 constructed of a ferromagnetic material such as steel. This frame or yoke 42 has an inner cylindrical surface 44 which receives a pair of permanent magnets 46 and 48. These permanent magnets may be constructed of conventional hard ceramic material and may be arcuate in configuration, with the outer surfaces 50 thereof conforming in shape to the inner cylindrical surface 44 of the frame or yoke 42.

The permanent magnets 46 and 48 are positioned within the frame or yoke 42 such that the edges 52 and 54 of permanent magnet 46 are positioned in circumferential spaced relationship with respect to the edges 56 and 58, respectively, of the permanent magnet 48.

One magnet retaining means or spring clip 10 is positioned in the space between the edges 52 and 56 of the permanent magnets 46 and 48, while another magnet retaining means or spring clip 10 is positioned between the edges 54 and 58 of the permanent magnets 46 and 48. The projections or tabs 18, 20, 22 and 24 engage the edges 52, 54, 56 and 58 of the permanent magnets 46 and 48 to retain them in position within the cylindrical frame or yoke 42. This is accomplished by internal stresses developed within the magnet retaining means or spring clips 10 and these internal stresses not only hold the permanent magnets 46 and 48 in position within the cylindrical frame 42, but also serve to hold the magnet retaining means or spring clips 10 within this cylindrical frame 42.

Figure 6:
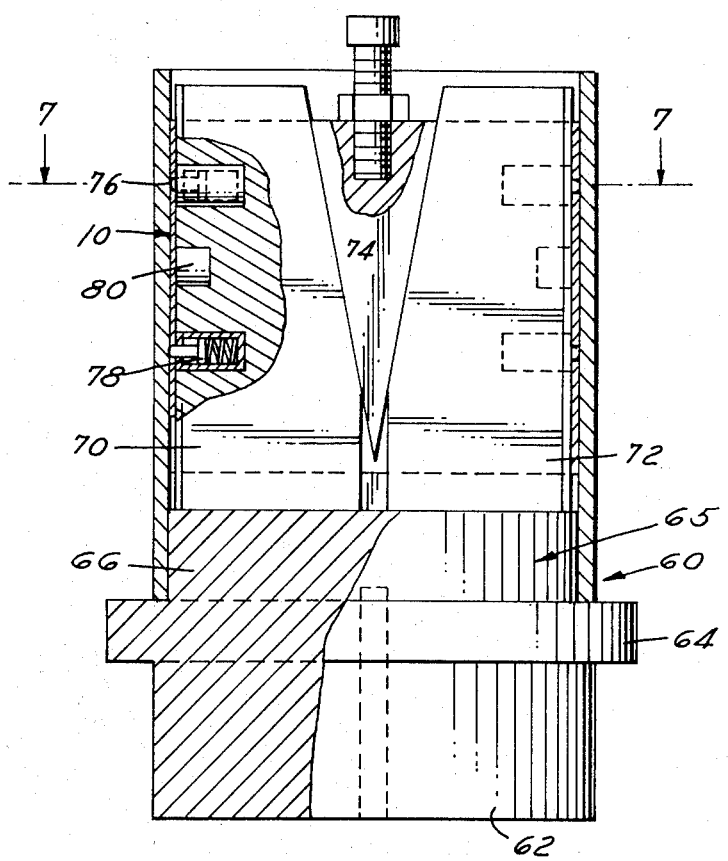
FIG. 6 is a sectional view taken along the lines 6—6 of FIG. 7 and showing a fixture for installing the magnet retaining means of the present invention.
Figure 7:
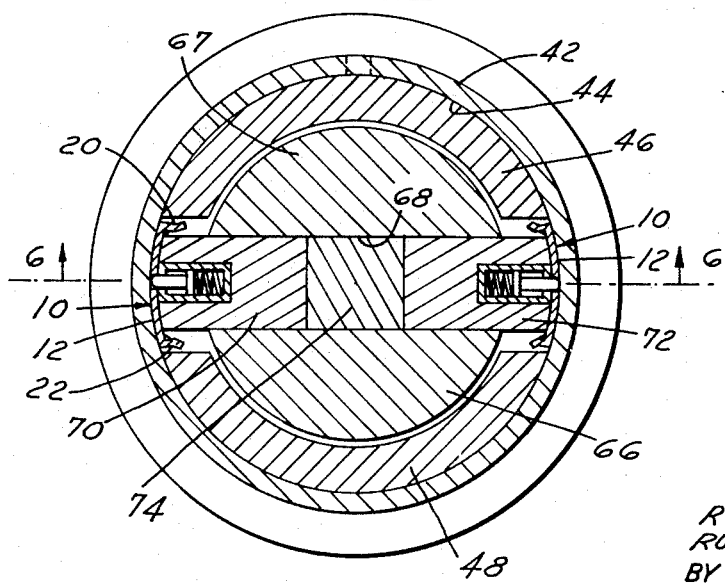
FIG. 7 is a sectional view taken along the lines 7—7 of FIG. 6.

The method and means for assembling the dynamoelectric machine stator 40 shown in FIGS. 4 and 5 and for developing he internal stresses within the magnet retaining means or spring clips 10, as discussed above, will now be described in relation to FIGS. 6 and 7. In these two figures there is shown in a fixture 60 having a base 62 with a radially outwardly extending flange 64. A cylindrical portion 65 extends upwardly from the radially extending flange 64. This cylindrical portion 65 includes a lower section 66 having an outer diameter just slightly smaller than the inner diameter of the frame or yoke 42 and an upper section 57 having an outer diameter just slightly smaller than the diameter defined by the inner surfaces of the permanent magnets 46 and 48. The section 67 has a diametral lot 68 extending across it as shown in FIG. 7. A pair of jaws 70 and 72 is mounted within the slot 68 for radial movement within the slot 68, and a wedge 74 is positioned between the jaws 70 and 72. The wedge 74 has outer surfaces complementary to the inner surface of jaws 70 and 72 to accomplish outward radial movement of the jaws 70 and 72 as the wedge 74 is forced downwardly as viewed in FIG. 6.

Each of the jaws 72 and 74 has two vertically spaced springloaded detents 76 and 78 and permanent magnet 80 positioned intermediate the detents 76 and 78. These detents are spaced to correspond to the spacing between the holes or apertures 34 and 36 in the body portion 12 of the magnet retaining means or spring clips 10.

In assembly operations one magnet retaining means or spring clip 10 is mounted on the jaw 70 and another magnet retaining means or spring clip 10 is mounted on jaw 72, with the spring-loaded detents 76 and 78 extending through the holes or apertures 34 and 36 respectively in the body portion 12 of the magnet retaining means or spring clips 10. The permanent magnets 80 hold the spring clips or magnet retaining means 10 in position on the outer face of the jaws 70 and 72. The cylindrical frame or yoke 42 is then positioned over the fixture 60 such that the end thereof engages the radially extending flange 64 as shown in FIG. 6. In this position the main body portion 12 and the tabs or projections 18, 20, 22 and 24 will be in an unstressed condition and will have relative positions with respect to one another as shown in FIGS. 1 through 3. The wedge 74 is then moved downwardly as shown in FIG. 6 to force the jaws 70 and 72 radially outwardly into the positions shown in FIGS. 6 and 7.

The above-described action deforms the main body portion 10 of the magnet retaining means or spring clips 10 outwardly into conformity with the inner cylindrical surface 44 of the cylindrical frame or yoke 42. Consequently, the tabs or projections 20 and 22 are rotated inwardly toward one another as shown in FIG. 7. This is also true with respect to the projections or tabs 18 and 24. The reinforcing or stiffening struts 26, 28, 30 and 32 maintain the angle between the main body portion 12 and these projections or tabs constant during this operation. Consequently, these tabs or projections are rotated toward each other about the corner formed between the intersection of the main body portion 12 and the tabs or projections. This provides sufficient space to permit the permanent magnets 46 and 48 to be inserted axially with respect to the cylindrical frame or yoke 42 into the fixture 60 between the inner surface 44 of the frame or yoke 42 and the upper section 67 of the cylindrical portion 65 of the base 62. This can most readily be seen by an examination of FIG. 7.

The wedge 74 is then moved upwardly to permit the jaws 72 and 70 to be moved radially inwardly and the spring-loaded detents 76 and 78 come out of engagement with the apertures 34 and 36. The completed stator 40 may then be moved axially upwardly from the base 62.

When the wedge 74 is removed, the internal stresses set up in the main body portion 12 and the tabs or projections 18, 20, 22 and 24 rotate the tabs 18 and 24 outwardly away from one another as well as rotating the projections or tabs 20 and 22 outwardly and away from one another. These tabs then engage he edges 52, 54, 56 and 58 of the permanent magnets 46 and 48 as shown in FIGS. 4 and 5.

The spacing between the tabs 18 and 24 and between the tabs 20 and 22 in the completed stator 40 as shown in FIG. 4 s intermediate the spacing shown in FIGS. 1 through 3 and the lesser spacing shown in FIG. 7 where the jaws 70 and 72 have been employed to rotate these tabs toward one another. Therefore, he tabs or projections 18, 20, 22 and 24 apply a large force on the edges 52, 54, 56 and 58 of the permanent magnets 46 and 48, thereby forcing the outward surface 50 of these magnets into engagement with the inner surface 44 of the frame or yoke 42. This force is sufficient to prevent any axial movement of the permanent magnets 46 and 48 with respect to the cylindrical frame or yoke 42. Additionally, the forces generated by the internal stressing of the spring clips or magnet retaining means 10 retain these spring clips or magnet retaining means within the cylindrical frame or yoke 42. Consequently, no additional fastening means is required to fasten the spring clips or magnet retaining means within the frame or yoke 42.

It can be appreciated by an inspection of FIG. 4 that in the assembled condition, the main body portion 12 of the magnet retaining means or spring clips 10 forms a chord cross an arcuate segment of the inner surface 44 of the frame or stator 42. Additionally, in this condition the main body portion 12 lies substantially in a plane as contrasted to its slightly bowed shape when the magnet retaining means or spring clip 10 is in its unstressed condition as shown in FIG. 3. This slight bowing of the main body portion 12 enhances or increases the forces applied by the tabs 18, 20, 22, and 24 on the edges of the permanent magnets 46 and 48.

Thus, the present invention provides an extremely simple and uncomplicated method for assembling a stator for a dynamoelectric machine and an extremely uncomplicated stator for a dynamoelectric machine that has a minimum of parts.

We claim:

1. A permanent magnet dynamoelectric machine stator comprising a cylindrical frame, a pair of arcuate shaped permanent magnets, each of said arcuate shaped permanent magnets having an outer surface with a radius approximately equal to the radius of the inner surface of said cylindrical frame, said pair of arcuate shaped permanent magnets being positioned in said frame with the outer arcuate surfaces thereof engaging said inner surface of said cylindrical frame, the edges of said permanent magnets being positioned in juxtaposed spaced relationship, a pair of spring clips constructed of spring steel positioned between said permanent magnets, each of said spring clips having a substantially rectangular body portion positioned substantially on a chord between the edges of said permanent magnets, and four tabs positioned at the ends of the longer sides of said body portion extending at an angle from either side of said body position and engaging the edges of said permanent magnet, the intersection of said body portion and said tabs and said body portion being in a stressed condition and applying an outward force against said permanent magnets and said clips for holding said permanent magnets and said clips in engagement with said frame.

2. A permanent magnet dynamoelectric machine comprising cylindrical frame constructed of a ferromagnetic material, a pair of arcuate permanent magnets, each of said permanent magnets having an outer surface positioned in engagement with the inner surface of said cylindrical frame, the edges of one permanent magnet being positioned in spaced relationship to the edges of the other permanent magnet, a pair of magnet retaining means positioned between said permanent magnets, said magnet retaining means including means engaging the edges of said permanent magnets and the inner surface of said cylindrical frame for holding both said permanent magnets and said magnet retaining means in position against the inner surface of said frame, each of said magnet retaining means comprising an elongated body portion and our tabs positioned at the ends of the longer sides of said body portion and extending at an angle from opposite sides thereof, one edge of two of said tabs engaging the edge of one of said permanent magnets and one edge of the other two of said tabs engaging he edge of the other of said permanent magnets, the intersection of said tabs and said body portion being in a stressed condition for applying an outward force on said permanent magnets and said magnet retaining means for holding said magnet retaining means and said permanent magnets in engagement with said frame.

3. A method of assembling a stator for a permanent magnet dynamoelectric machine comprising, placing a pair of clips in a fixture in opposed relationship, said clips having a body portion and at least one pair of tabs extending at an angle to said body portion, placing a ferromagnetic cylindrical frame over said fixture and said clips, with said body portion forming a chord across a portion of said cylinder, exerting a radial outward force on the body portion of each clip, inserting a pair of arcuate permanent magnets in said fixture between said clips, and removing said force from the body portion of said clips whereby said tabs engage said permanent magnets to hold said permanent magnets in said frame.

4. A method of assembling a stator for a dynamoelectric machine comprising, placing a pair of spring clips having a body portion and two tabs extending at angles with respect to said body portion in opposed relationship against the inner surface of a cylindrical ferromagnetic frame, with said body portion forming a chord across a portion of said inner surface, applying a radial outward force on each of said main body portions of sufficient magnitude to cause said body portions to conform to the shape of the inner surface of said cylindrical ferromagnetic housing whereby said tabs are rotated inwardly toward each other, inserting a pair of arcuate permanent magnets of suitable dimension axially into said frame between said clips, removing said force whereby said tabs rotate outwardly away from each other and into engagement with the edges of the permanent magnets to hold said permanent magnets in said cylindrical frame.

5. A method of assembling a stator for a permanent magnet dynamoelectric machine comprising, placing a pair of spring clips, each having a body portion and a pair of tabs extending from opposite sides of said body portion to form corners at the intersection of the tabs and the body portion, in opposed relationship against the inner surface of the cylindrical frame with the corners of each clip forming a chord across the inner surface of the cylindrical frame and with the central portion of the body portion being spaced from the inner surface of the frame, applying a radial outward force on the body portion of each of the clips of sufficient magnitude to conform the shape of the body portion of the clips to the inner surface of the cylindrical frame whereby the ends of said tabs are rotated about said corners inwardly toward each other, inserting a pair of permanent magnets axially into the frame between the clips, the permanent magnets having an outer arcuate surface conforming to the inner surface of the cylindrical frame and having an arcuate length such that the space between the edge of one magnet and the edge of the other magnet is greater than the space between the tabs subsequent to the application of the radial force, but less than the space between the tabs prior to the application of the radial force, and removing the radial force whereby the tabs rotate outwardly from each other about the corners into engagement with the edges of the permanent magnets to hold the permanent magnets in position in the cylindrical frame.

* * * * *